(12) United States Patent
Jagan et al.

(10) Patent No.: US 11,989,526 B2
(45) Date of Patent: May 21, 2024

(54) SYSTEMS AND METHODS FOR SHORT TEXT SIMILARITY BASED CLUSTERING

(71) Applicant: Allstate Solutions Private Limited, Bangalore (IN)

(72) Inventors: Balaji Jagan, Karnataka (IN); Prajwal K. Kunder, Karnataka (IN)

(73) Assignee: Allstate Solutions Private Limited, Bangalore (IN)

(*) Notice: Subject to any disclaimer, the term of this patent is extended or adjusted under 35 U.S.C. 154(b) by 299 days.

(21) Appl. No.: 17/585,024

(22) Filed: Jan. 26, 2022

(65) Prior Publication Data

US 2023/0267281 A1 Aug. 24, 2023

(51) Int. Cl.
*G06F 40/40* (2020.01)
*G06F 40/279* (2020.01)
*G06V 30/19* (2022.01)

(52) U.S. Cl.
CPC ............ *G06F 40/40* (2020.01); *G06F 40/279* (2020.01); *G06V 30/19093* (2022.01); *G06V 30/19107* (2022.01)

(58) Field of Classification Search
CPC ...... G06F 40/40; G06F 40/279; G06F 16/355; G06V 30/19093; G06V 30/19107

USPC .......................................................... 704/9
See application file for complete search history.

(56) References Cited

U.S. PATENT DOCUMENTS

2015/0127323 A1 5/2015 Jacquet et al.

OTHER PUBLICATIONS

International Search Report and Written Opinion for Application No. PCT/ US2023/ 061157, dated Apr. 14, 2023, 14 pages.

*Primary Examiner* — Thierry L Pham
(74) *Attorney, Agent, or Firm* — Dinsmore & Shohl LLP

(57) ABSTRACT

Methods and systems for receiving a plurality of documents including short text data and determining a plurality of forward similarity values based on the short text data in each of the plurality of documents, determining a plurality of reverse similarity values based on the short text data in each of the plurality of documents, generating a forward and reverse similarity matrix based on the plurality of forward similarity values and the plurality of reverse similarity values, and generating a plurality of short text similarity based clusters to group the short text data of the plurality of documents based on the forward and reverse similarity matrix.

20 Claims, 10 Drawing Sheets

Sentence1: *Investigating a Premium Difference*
Sentence2: *Premium Difference Investigations for Quote, New Business and Pended Endorsements*

| S1/S2 | investigating | a | premium | difference |
|---|---|---|---|---|
| premium | 0.73165905 | 0 | 1 | 0.844 |
| difference | 0.77563167 | 0 | 0.844 | 1 |
| investigations | 0.82155734 | 0 | 0.774 | 0.861 |
| for | 0 | 0 | 0 | 0 |
| quote | 0.5199179 | 0 | 0.443 | 0.514 |
| new | 0.45910716 | 0 | 0.444 | 0.483 |
| business | 0.46275586 | 0 | 0.366 | 0.44 |
| and | 0 | 0 | 0 | 0 |
| pended | 0.61981237 | 0 | 0.568 | 0.717 |
| endorsements | 0.7914685 | 0 | 0.83 | 0.921 |

FIG. 5

| S1/S2 | premium | difference | investigations | for | quote | new | business | and | pended | endorsements |
|---|---|---|---|---|---|---|---|---|---|---|
| investigating | 0.731659 | 0.775632 | 0.821557 | 0 | 0.519918 | 0.459107 | 0.462756 | 0 | 0.619812 | 0.791469 |
| a | 0 | 0 | 0 | 0 | 0 | 0 | 0 | 0 | 0 | 0 |
| premium | 1 | 0.844 | 0.774 | 0 | 0.443 | 0.444 | 0.366 | 0 | 0.568 | 0.83 |
| difference | 0.844 | 1 | 0.861 | 0 | 0.514 | 0.483 | 0.44 | 0 | 0.717 | 0.921 |

FIG. 6

Clustering output distribution for survey data - TF IDF Based Clustering

| Cluster Number | Number of reviews in each cluster | Distribution of reviews in each cluster |
|---|---|---|
| cluster_9 | 1950 | 44.46% |
| cluster_12 | 348 | 7.93% |
| cluster_4 | 258 | 5.88% |
| cluster_24 | 191 | 4.35% |
| cluster_20 | 190 | 4.33% |
| cluster_22 | 178 | 4.06% |
| cluster_6 | 170 | 3.88% |
| cluster_10 | 131 | 2.99% |
| cluster_2 | 126 | 2.87% |
| cluster_8 | 114 | 2.60% |
| cluster_7 | 102 | 2.33% |
| cluster_21 | 93 | 2.12% |
| cluster_3 | 92 | 2.10% |
| cluster_5 | 92 | 2.10% |
| cluster_13 | 72 | 1.64% |
| cluster_15 | 71 | 1.62% |
| cluster_18 | 71 | 1.62% |
| cluster_23 | 47 | 1.07% |
| cluster_17 | 32 | 0.73% |
| cluster_16 | 19 | 0.43% |
| cluster_19 | 17 | 0.39% |
| cluster_11 | 11 | 0.25% |
| cluster_14 | 9 | 0.21% |
| cluster_0 | 1 | 0.02% |
| cluster_1 | 1 | 0.02% |

FIG. 8A

SYSTEMS AND METHODS FOR SHORT TEXT SIMILARITY BASED CLUSTERING

TECHNICAL FIELD

The present disclosure relates to computational clustering systems and methods, particularly to computational clustering systems and methods for short text similarity based clustering of short text documents.

BACKGROUND

Cluster analysis is a process that may be used for segmenting a set of objects into groups based on pre-defined features of the objects. Document clustering applies such cluster analysis to text-based documents. The process may involve natural language processing (NLP) to categorize and provide structure to unstructured text data. Clustering often relies on documents containing a significant amount of text sufficient for analysis such that the documents may be evenly distributed among the clusters. A need exists for clustering methods directed to short text clustering when a significant amount of text sufficient for analysis is not readily available.

BRIEF SUMMARY

According to the subject matter of the present disclosure, a short text similarity based clustering system may include one or more processors, one or more memory components communicatively coupled to the one or more processors, and machine-readable instructions stored in the one or more memory components. The machine-readable instructions may cause the short text similarity based clustering system to receive a plurality of documents comprising short text data and determine a plurality of forward similarity values based on the short text data in each of the plurality of documents, wherein a forward similarity value of one indicates a subsequent document comprises at least the short text data of a preceding document. The machine-readable instructions may further cause the short text similarity based clustering system to determine a plurality of reverse similarity values based on the short text data in each of the plurality of documents, wherein a reverse similarity value of one indicates the preceding document comprises at least the short text data of the subsequent document. The machine-readable instructions may further cause the short text similarity based clustering system to generate a forward and reverse similarity matrix based on the plurality of forward similarity values and the plurality of reverse similarity values, and generate a plurality of short text similarity based clusters to group the short text data of the plurality of documents based on the forward and reverse similarity matrix.

In accordance with one embodiment of the present disclosure, a short text similarity based clustering system may include one or more processors, one or more memory components communicatively coupled to the one or more processors, and machine-readable instructions stored in the one or more memory components. The machine-readable instructions may cause the short text similarity based clustering system to receive a plurality of documents comprising short text data and preprocess the short text data of each of the plurality of documents to generate a preprocessing based on a natural language processing (NLP) tool comprising a library, the NLP tool configured to use the library to extract text information from the short text data. After the preprocessing, the machine-readable instructions may cause the short text similarity based clustering system to determine a plurality of forward similarity values based on the short text data in each of the plurality of documents, wherein a forward similarity of one indicates a subsequent document comprises at least the short text data of a preceding document. The machine-readable instructions may also cause the short text similarity based clustering system to determine a plurality of reverse similarity values based on the short text data in each of the plurality of documents, wherein a reverse similarity of one indicates the preceding document comprises at least the short text data of the subsequent document. The machine-readable instructions may further cause the short text similarity based clustering system to generate a forward and reverse similarity matrix based on the plurality of forward similarity values and the plurality of reverse similarity values and generate a plurality of short text similarity based clusters to group the short text data of the plurality of documents based on the forward and reverse similarity matrix.

In accordance with another embodiment of the present disclosure, a short text similarity based clustering method may include receiving a plurality of documents comprising short text data and determining a plurality of forward similarity values based on the short text data in each of the plurality of documents, wherein a forward similarity of one indicates a subsequent document comprises at least the short text data of a preceding document. The method may also include determining a plurality of reverse similarity values based on the short text data in each of the plurality of documents, wherein a reverse similarity of one indicates the preceding document comprises at least the short text data of the subsequent document. The method may further include generating a forward and reverse similarity matrix based on the plurality of forward similarity values and the plurality of reverse similarity values and generating a plurality of short text similarity based clusters to group the short text data of the plurality of documents based on the forward and reverse similarity matrix.

Although the concepts of the present disclosure are described herein with primary reference to insurance, it is contemplated that the concepts will enjoy applicability to any setting for purposes of text clustering. For example, and not by way of limitation, it is contemplated that the concepts of the present disclosure will enjoy applicability to social media posts, comments, reviews, and other situations that generate short text data.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 5 illustrates a forward similarity matrix listing forward similarity values for a pair of sentences of two short text documents, according to one or more embodiments shown and described herein;

FIG. 6 illustrates a reverse similarity matrix listing reverse similarity values for the pair of sentences of FIG. 5 in a transposed matrix, according to one or more embodiments shown and described herein;

FIG. 8A illustrates results of an implementation for clustering short text with a non-short text clustering method, according to one or more embodiments shown and described herein;

DETAILED DESCRIPTION

Document clustering may reference an application of clustering algorithms to natural language data, such as documents containing text as such natural language data to be parsed and analyzed. Document clustering algorithms can group documents into sets of "clusters" that are internally similar but externally distinct. A goal may be to cluster documents such that documents in one cluster are more similar in their features to each other than to documents of another cluster. Such document clustering aids to provide structure and organization to a set of data, which structure may provide further insights about the dataset. For instance, user profiling and recommendation systems can rely heavily on document clustering to find similarities between documents and find relevant documents to recommend to users.

Methods of document clustering may rely on the document containing a significant amount of text sufficient for analysis such that clusters may be somewhat evenly divided. One such method involves term frequency-inverse document frequency (TF-IDF) based clustering. TF-IDF is a numerical statistic indicative of how important a word is to a document in a set of documents. A TF-IDF value increases proportionally to the number of times a word appears in a document and is offset by the number of documents in the set of documents.

However, when the documents in a set of documents contain only short text (e.g., social media posts, surveys, comments, reviews, etc.) a data sparsity problem is introduced because most words may only occur once in each short text document and not provide a sufficient amount of verbiage for efficient clustering analysis. As a result, based on clustering of short text data not sufficient for TF-IDF analysis, the TF-IDF measure may underperform and TF-IDF based clustering (e.g., K-means clustering) may output unbalanced clusters.

Figure 1:
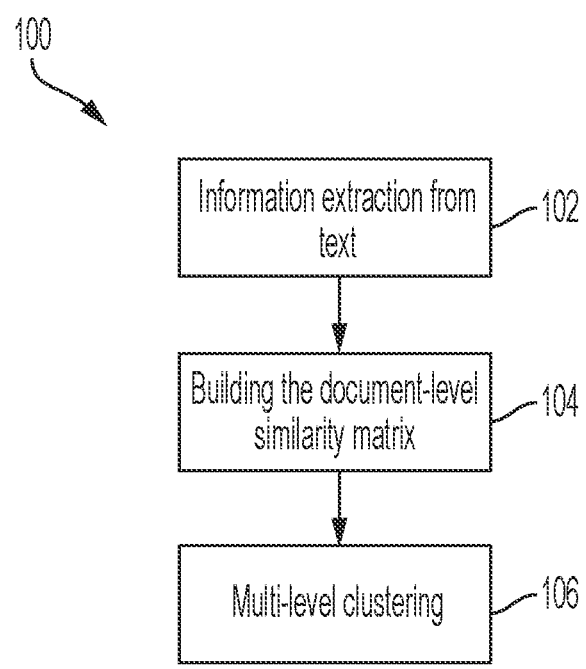
FIG. 1 illustrates a flowchart of tasks of a process for short text similarity based clustering, according to one or more embodiments shown and described herein.

Embodiments described herein are directed to methods and systems for short text similarity based clustering. Referring to FIG. 1, an embodiment of a process 100 including tasks for short text similarity based clustering is shown. As described in greater detail below, information is extracted from the text in block 102. A document-level similarity matrix is built in block 104, and multi-level clustering is performed in block 106 using the document level similarity matrix.

Figure 2:
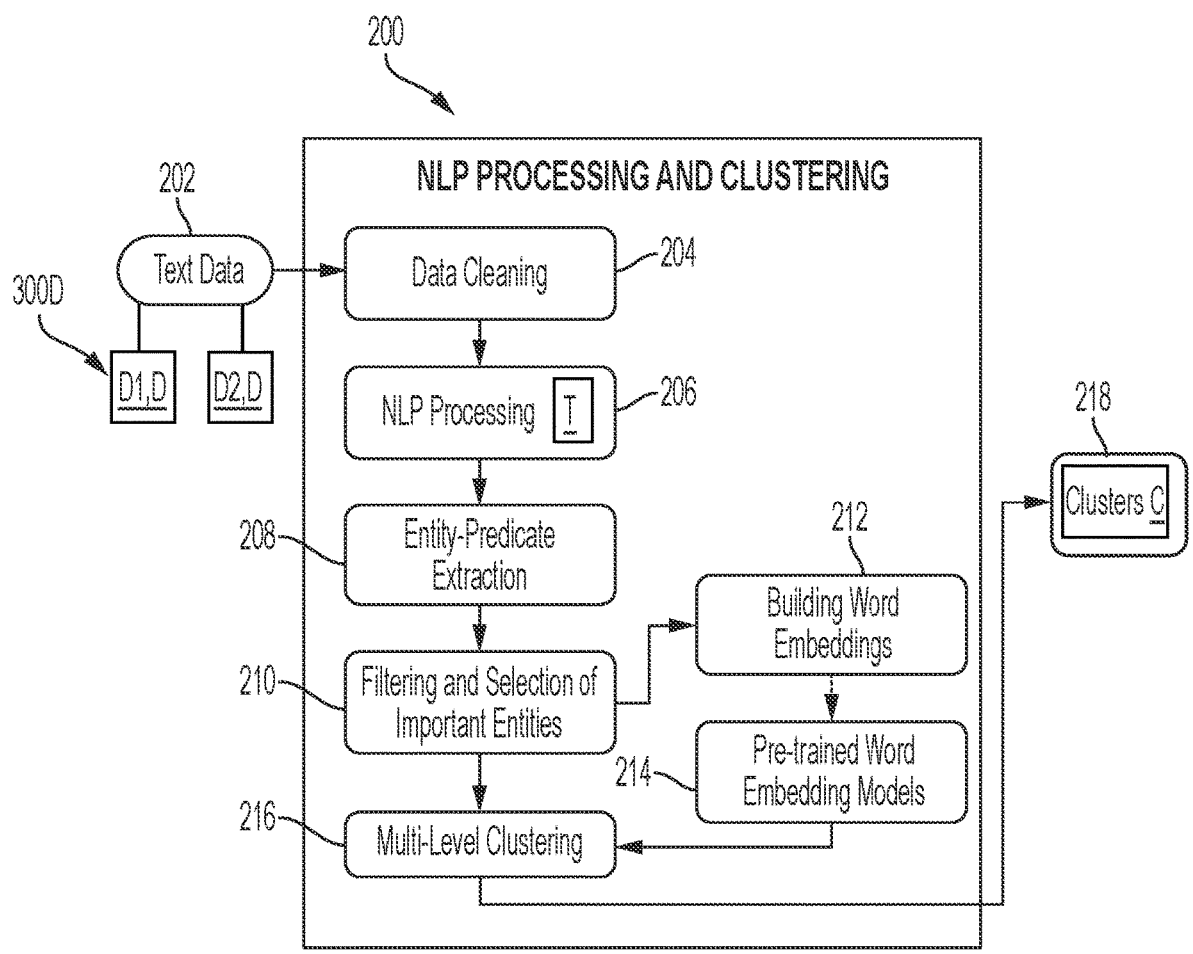
FIG. 2 illustrates a flowchart of a process for short text similarity based clustering including natural language processing, according to one or more embodiments shown and described herein.

FIG. 2 illustrates an embodiment of a process 200 as an expansion of the process 100 of FIG. 1 for short text similarity based clustering including pre-processing such as natural language processing (NLP). Such pre-processing may include at least data cleaning in block 204, NLP in block 206, and entity-predicate extraction in block 208 as described below. Blocks 202-208 of FIG. 2 may be associated with the information extraction of block 102 of FIG. 1, blocks 210-214 of FIG. 2 may be associated with and expand upon the matrix building of block 104 of FIG. 1, and blocks 216-218 of FIG. 2 may be associated with and expand upon the multi-level clustering of block 106 of FIG. 1. In block 202 of FIG. 2, the process 200 receives an input set of short text documents as text data. The text data may be received from a plurality of documents D such as a preceding document D1 and a subsequent document D2 of a document set 300D. In block 204, the text data is cleaned. Cleaning the text data may include changing the text into a uniform case, removing punctuation, removing stop words, stemming, lemmatization, or application of other data cleaning techniques, as described in greater detail further below with respect to block 204.

In block 206, the cleaned text data is preprocessed via natural language processing (NLP) using an NLP tool T. In block 208, the preprocessed data is subjected to entity-predicate extraction. In block 210, outlier and biasing entities are removed from the text data through filtering and extraction of important entities. The process 200 may proceed from block 210 to block 216 to conduct multi-level clustering as described herein. Alternatively, the process 200 may proceed from block 210 to block 212, in which word embeddings are built to use as pre-trained word embedding models in block 214 prior to advancing onto block 216 to conduct multi-level clustering using a generated document-level similarity matrix, as described in greater detail further below. The process 200 then advances from the block 216 to block 218 in which one or more clusters C are generated as described herein. In block 218, the clusters C may be generated by using the multi-level clustering process of block 216 to determine a maximum and minimum similarity score. A threshold may be generated based on the ratio between the maximum and minimum similarity score, and outlier data points may be removed based on the minimum similarity score while masking biasing data points based on the maximum similarity score to create a compressed forward and reverse similarity matrix (such as compressed matrix 400C of FIG. 4 as described in greater detail below). Clustering can then be performed on the compressed matrix based on the generated threshold. Links between the forward and the reverse similarity of documents may be identified to incorporate into the clusters. The threshold generation, matrix compression, and link finding may be repeated to build the clusters iteratively.

Information extracted from document text in block 102 of FIG. 1 may be subjected to processing techniques such as natural language processing ("NLP") as described above for block 206 of FIG. 2. The NLP technique may include removing sentiment specific words, identifying domain dependent and independent terms, identifying multi-word expressions, gathering statistical information, and other applications to identify and filter extracted information. In embodiments, sentiment specific words are words that identify an individual's affective states and subjective feelings. Domain dependent and independent terms are terms that have a particular meaning in the subject matter of the document (i.e., the domain) and terms that carry the same meaning across subject matter. Multi-word expressions are words (i.e., "terms" or "entities") that often appear together to convey a single meaning. Statistical information that may be gathered include entity (including multi-word expressions) frequency, co-occurrence term frequency, distributional frequency of entities over the text of the documents, or distributional frequency of entities with the predicates and with the other terms.

Figure 4:
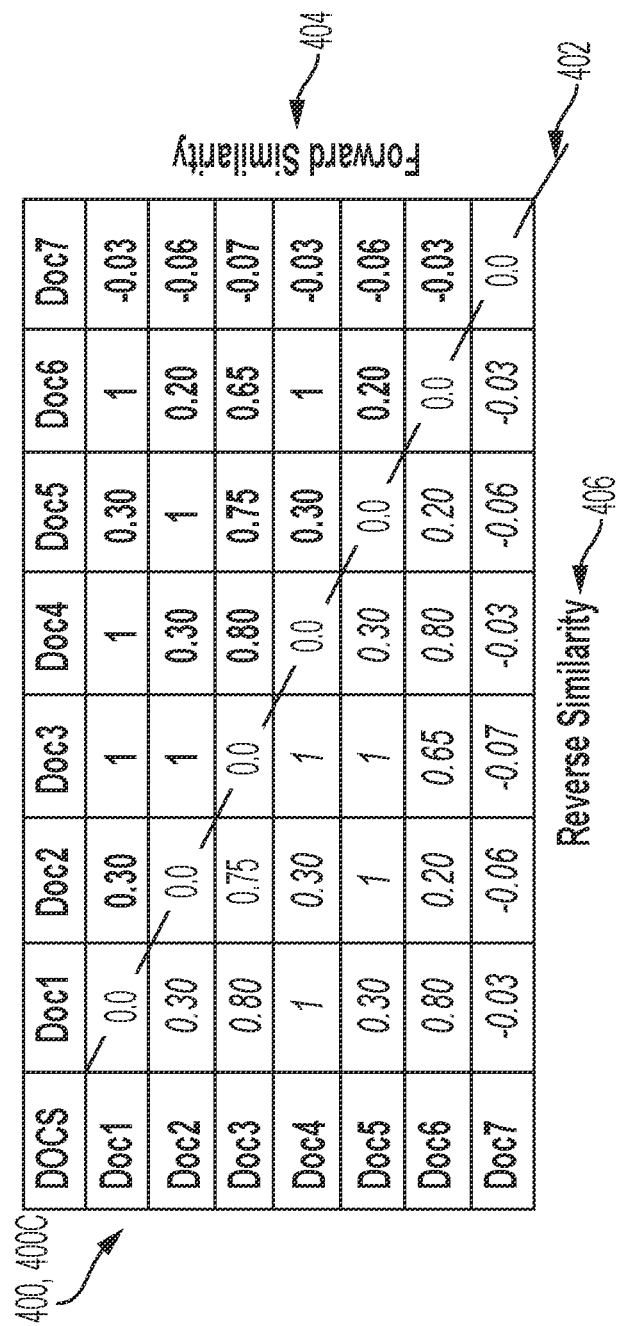
FIG. 4 illustrates a document level forward/reverse similarity matrix of the plurality of short text documents of FIG. 3, according to one or more embodiments shown and described herein.

Referring again to FIG. 1, in block 104, a document level similarity matrix 400 (as shown in FIG. 4, described in greater detail below) is built based on the processed text of block 102. Embodiments described herein may compute a forward similarity and a reverse similarity of compared text of documents, and build the document level similarity matrix 400 based on associated computations.

In block 104, a cosine similarity as described in greater detail below may be calculated between the vectors of each sentence pair of compared documents to generate a forward similarity matrix 500 of FIG. 5, as described in greater detail further below. The calculation of cosine similarity between the vectors of each reversed sentence pair may be used to generate a reverse similarity matrix 600, which is also the transpose of forward similarity matrix 500.

In block 106 of FIG. 1, a multi-level short text similarity based clustering may be performed on the documents based on the matrix of block 104, such as through application of an iterative process. In embodiments, the iterative process includes finding a maximum and minimum similarity score in each row of the matrix and computing a ratio between the maximum and minimum similarity score to set a dynamic threshold. The iterative process also may include compressing the matrix by removing and/or ignoring certain values. Values that are below the minimum similarity score (i.e., outliers) may be removed from the matrix. Values that are above the maximum similarity score may be ignored in an iteration (i.e., data points that will likely lead to a highly biased cluster centroid). Once the matrix has been compressed, clustering is performed on the compressed matrix. Documents that are within a cluster range for each cluster are included in the respective cluster. The iterative process can be repeated until the matrix can no longer be compressed.

Referring again to FIG. 2, the process 200 for short text similarity based clustering including NLP tool as a pre-processing technique is depicted as an expansion of the process 100 of FIG. 1. The process 200 begins in block 202 with receiving text data as a plurality of documents, such as short text documents, each including short text data. In embodiments, short text documents are documents that contain few words or sentences, such as reviews and social media posts of limited textual length. As a non-limiting example, short text data may include less than or equal to 256 alphanumeric characters. Additionally or alternatively, short text data as described herein is sparse with a low number of features that may not provide enough word co-occurrence as background information for an acceptably accurate similarity measure between different texts without use of the methods described herein. Non-limiting examples of short text documents including short text data may include social media message such as tweets, chat messages, search queries, product descriptions, and/or online reviews. Once the short text documents for clustering are received, the process moves to block 204.

In block 204, the text data of each document is cleaned. Cleaning the text data may include changing all the text into a uniform case, removing punctuation, removing stop words, stemming, lemmatization, among other text cleaning, condensing, and filtering techniques. In embodiments, stop words include function words such as "a," "an," "the," "you," and the like that are very common in document text and may add complexity to NLP analysis. Stemming applies methods of reducing different forms of a word to its root (e.g., "calls" and "called" can be reduced to "call"), and lemmatization is directed to grouping together inflected forms of a word to be analyzed as a single identity identified by a word's lemma (e.g., dictionary form or headword). Such use of filtering techniques aids to reduce complexity while simplifying words and causing a root or lemma of a word to appear more often for analysis when applying a clustering algorithm to short text documents. Once the data is cleaned, the process 200 advances to block 206.

In block 206, the text data of the plurality of documents goes through an NLP technique in pre-processing. The NLP technique may include removing sentiment specific words, identifying domain dependent and independent terms, gathering statistical information, and other suitable schemes applied by NLP as understood to one of ordinary skill in the art. In embodiments, sentiment specific words are words that identify an individual's affective state and subjective feelings. Domain dependent and independent terms are terms that have a particular meaning in the subject matter of the document and terms that carry the same meaning across subject matter, respectively. Statistical information that may be gathered include entity frequency, co-occurrence term frequency, distributional frequency of entities over the text of the documents, distributional frequency of entities with the predicates and with the other terms, and other suitable statistical information associated with text analysis. Once NLP pre-processing has been performed, the process 200 moves to block 208.

In block 208, entity-predicate extraction is performed. As a non-limiting example, NLP programs may be used to identify and tag multi-word expressions and identify the relationship between the entities and its predicates in the text data. Multi-word expressions may be words that often appear together to convey a single meaning. The entities of a document, single- and multi-word, may be tagged according to their part of speech. Such tagging allows for the understanding of the structure of the sentence and the relationships between its words. The entity-predicate extraction further aids with identification of entities that more heavily influence the documents than other entities so that documents with a significant amount of these entities may be removed during the clustering process to prevent them from becoming a biasing centroid of a cluster. After entity-predicate extraction has been performed, the process moves to block 210.

In block 210, the similarity matrices are built. In embodiments, the pre-processed text data is used to compute a forward similarity and a reverse similarity of the documents, and the document level similarity matrix is built based on the computed forward and reverse similarities. To compute the similarity between two documents in either a forward or reverse direction, domain-specific models may be used to perform word embedding. As a non-limiting example, a word embedding tool maps individual words as real-valued vectors in a predefined vector space of multiple dimensions. Domain specific models may be created based on supervised machine learning trained on a subset of the documents. In block 214, the domain specific models may be merged with the pre-trained models for potentially enhanced accuracy in word embedding performance.

Once the documents have been vectorized, the cosine similarity between the vectors of each sentence pair may be calculated to generate a forward similarity matrix 500 of FIG. 5, described in greater detail further below. The calculation of cosine similarity between the vectors of each reversed sentence pair may be used to generate a reverse similarity matrix 600, which is also structured as a transpose of the forward similarity matrix 500. Formulas for forward similarity and reverse similarity matrices are described in the discussion of FIGS. 5 and 6, below.

The document level similarity matrix 400 is built by combining an associated forward similarity matrix 500 and reverse similarity matrix 600 such that values from the associated forward similarity matrix 500 may populate an upper triangular matrix of the document level similarity matrix 400, and values from the associate reverse similarity matrix 600 may populate a lower triangular matrix of the document level similarity matrix 400. While the values of the forward similarity matrix 500 and the reverse similarity matrix 600 of FIGS. 5 and 6 are generated based on an different analyzed document set than the document level similarity matrix 400 shown in FIG. 4, a similar process is understood to be applied to generate associated forward and reverse similarity matrices from a document set 300 of FIG. 3 to generate the document level similarity matrix 400 of FIG. 4. The forward similarity values 404 of FIG. 4 are provided from the associated forward similarity matrix, and the reverse similarity values 406 are provided from the associated reverse similarity matrix (delineated along the line 402). Once the document level similarity matrix 400 is built, the process 200 may move to block 216.

In block 216, multi-level clustering occurs such as through an iterative process. The iterative process may include finding a maximum and minimum similarity score in each row of the matrix and computing a ratio between the maximum and minimum similarity score to set a dynamic threshold. Documents with a similarity value greater than the threshold may be considered closely related documents for grouping under the same cluster.

The iterative process may also include compressing a matrix such as the document level similarity matrix 400 of FIG. 4 by removing and/or ignoring certain values. Values that are below the minimum similarity score (as outlier values) may be removed. For instance, the minimum similarity score may be zero, and thus all documents with similarity scores less than zero may be removed from the matrix representation. An example of an outlier document may be document 314 of FIG. 3 because it contains insufficient or junk information compared to the other documents of the document set 300 of FIG. 3.

Values that are above the maximum similarity score may be ignored (i.e., data points that will likely lead to a highly biased cluster centroid). Such a highly biased cluster centroid may otherwise generate a first cluster that consumes most of the documents because a small number of documents are highly correlated with most of the data points in the data set due to such biasing. Leaving these documents in consideration during clustering may thus bias the data set, leading to potentially imbalanced and/or noisy clusters. Schemes to identify such potentially biasing data points may include identifying domain dependent and independent terms using an inter-domain entropy measure, extracting domain specific entities, and finding the distribution of entities using entropy measures (e.g., context entropy, left context entropy, right context entropy, cross entropy, and reverse cross entropy), extracting the top K domain independent terms, computing the distribution and correlation between the entities in the text using conditional probability, computing the percentage of documents that contain only common terms, and computing the percentage of documents with maximum similarity. Such schemes may be applied to the matrix representation of the documents at each iteration of the multi-level clustering. The maximum similarity range may vary at each iteration, and the similarity range may be decided based on the values closer to the maximum similarity value in a row.

Once the document level similarity matrix 400 is been compressed (e.g., to become compressed document level similarity matrix 400C of FIG. 4), clustering is performed on the compressed document level similarity matrix 400. Documents that are within a cluster range for each cluster may be included in the respective cluster. That is, documents having forward and reverse similarities equal or close to each other may be within the cluster range for a cluster and be included in the cluster. Additionally, documents that are within a cluster range for documents in a different cluster may be included in the different cluster. Block 216 repeats the iterative process to generate as a result and output the clusters of the documents at block 218.

Figure 3:
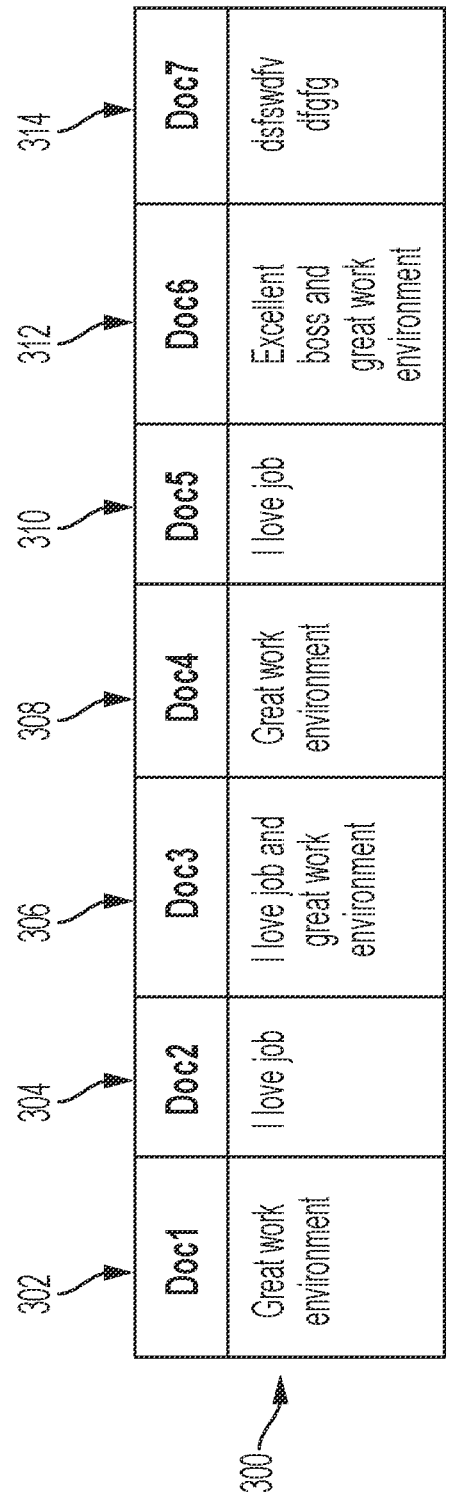
FIG. 3 illustrates a plurality of short text documents for clustering, according to one or more embodiments shown and described herein.

Referring to FIG. 3, the document set 300 includes a plurality of short text documents 302-314. In the embodiment of FIG. 3, each document is indicative of a review of a job. As a job review, these documents 302-314 tend to be shorter in text length than longer text documents and thus may have sparse text data leading to a data sparsity issue. To clean, as set forth in block 204, these documents for multi-level clustering in block 216, the text of the documents 302-314 may be pre-processed through blocks 204-210 as described above. As a non-limiting example, the text of each of the documents 302-314 may be changed into a uniform case, punctuation may be removed, stop words may be removed, the words may be stemmed and lemmatized, and other filtering and pre-processing techniques may be applied to the text data. In an embodiment, the documents 302-314 may all become capitalized to be changed into the same uniform case, which may reduce a risk of the same letters of different cases being treated differently. Thus, the text in document 312 would become "EXCELLENT BOSS AND GREAT WORK ENVIRONMENT." In another embodiment, the word "and" in documents 306 and 312 may be treated and removed as a stop word.

The NLP techniques of block 206 may include extracting information from document text of documents 302-314, such as identifying sentiment specific words, identifying domain dependent and independent terms, identifying multi-word expressions, gathering statistical information, among other pre-processing NLP techniques. Sentiment specific words may include "great" in documents 302, 306, 308, and 312, "love" in documents 304, 306, and 310, and "excellent" in document 312 because they identify affective states and subjective feelings. Multi-word entities may include "work environment" in documents 302, 306, 308, and 312 because "work" and "environment" frequently occur together and convey a single meaning.

Referring to FIG. 4, the document level similarity matrix 400 is depicted. The document level matrix 400 is a combination of associated forward and reverse similarity matrices including the respective forward and reverse similarity values 404, 406. The forward and reverse similarity values 404, 406 are developed for the document set 300 of FIG. 3 similar to how the specific values of the forward similarity matrix 500 and the reverse similarity matrix 600 are generated based on a comparison of a pair of sentences in FIGS. 5-6, which is described in greater detail further below. The document level similarity matrix 400 of FIG. 4 combines such associated forward similarity values 404 and reverse similarity values 406 generated from each document comparison of documents 302-314 of document set 300. In FIG. 4, the line 402 is dashed in to illustrate a delineation between the forward similarity values 404 of an associated forward similarity matrix and the reverse similarity values 406 of an associated reverse similarity matrix. The document level similarity matrix 400 is built by combining the associated forward similarity matrix including the forward similarity values 404 and the reverse similarity matrix including the reverse similarity values 406. The forward similarity values 404 may be populated into an upper triangular portion of the document level similarity matrix 400. The reverse similarity values 406 may be populated into a lower triangular portion of the document level similarity matrix 400. The line 402 runs across values of zeros generated between the same documents as a document in the document level similarity matrix 400 does not get compared against itself to generate a similarity value.

The computation of forward and reverse similarities 404, 406 of FIG. 4 generated based on the documents 302-314 of the document set 300 of FIG. 3 illustrate that forward and reverse similarities between a document pair are not always the same. For instance, the forward and reverse similarities 404 and 406 between documents 302 and 308 are 1. On the other hand, the forward and reverse similarities 404 and 406 between document 302 ("Doc1") and document 306 ("Doc3") are different, being 1 and 0.80, respectively. When computing the cosine similarity between the vector of document 302 with the vector of document 306, the similarity value is 1 as all the words of preceding document 302 are exactly matched with the words of subsequent document 306. However, while computing reverse similarity, not all words of subsequent document 306 are matched with the words of preceding document 302, and thus the reverse similarity is lower. Hence, a forward similarity value of one indicates a subsequent document (e.g., document 306) includes at least the short text data of a preceding document (e.g., document 302). A reverse similarity value of one indicates the preceding document (e.g., document 308 as Doc4) includes at least the short text data of the subsequent document (e.g., document 306 as Doc3).

Referring now to FIG. 5, a forward similarity matrix 500 between a pair of sentences 502 and 504 is depicted. To compute the plurality of forward cosine similarity values 506 between two documents, such as documents including the pair of sentences 502, 504, domain-specific models, pre-trained models, or combinations thereof may be used to perform word embeddings. As described herein, such word embeddings may map individual words as real-valued vectors in a predefined vector space. The features of one document vector may be the vector of the document it is being compared against, often resulting in a vector space of more than two dimensions. Use of pre-trained word embeddings, such as Global Vector Representation (GloVe), may result in less accurate similarity values when trained based on a generic set of documents, whereas the documents analyzed may have a specific domain that is not generic (i.e., subject or specialized topic based). If text in the analyzed set of documents is likely to contain words belonging to a specialized topic that would be out-of-vocabulary for pre-trained embeddings, the word embeddings may generate similarity values that are not in fact representative of the similarity between the words.

For instance, the words "premium" in sentence 502 and "endorsements" in sentence 504 have meanings in the insurance domain that differ from a generic meaning. An insurance premium may be indicative of the payment for insurance, and an insurance endorsement may be indicative of an amendment or addition to an existing insurance contract that changes the terms or scope of the original policy. However, "premium" in a generic scope may refer to something of exceptional quality, and "endorsement" in a generic scope may refer to an expression of support or approval. Because of these differences in meaning, a pre-trained model on a generic set of documents used for word embeddings may find a low degree of similarity between "premium" and "quote," whereas a model trained on specific insurance documents and insurance meanings as a subject may find a higher degree of similarity between such terms. Domain specific models for may be created based on supervised machine learning trained on a subset of the documents. The domain specific models may be merged with the pre-trained models for further accuracy in use of such word embedding techniques.

Once the documents have been converted to vectors of real numbers, the cosine similarity can be calculated as described herein. Generating a forward similarity matrix 500 involves the calculation of cosine similarity between the vectors of each document pair (e.g., sentences 502, 504). The calculation of forward cosine similarity values 506 can be represented by the formula set forth in EQUATION 1 below.

$$\text{Similarity}_{Forward}(D_i, D_j) = [\cosine(\text{vector}(D_i), \text{vector}(D_j))] \quad \text{(EQUATION 1)}$$

An output of EQUATION 1 may be an X by Y matrix populated with forward cosine similarity values 506 (calculated similar to how forward similarity values 404 of FIG. 4 are calculated), where X is representative of the number of words in the sentence 502 analyzed as the first sentence and Y is representative of the number of words in the sentence 504 analyzed as the second sentence.

Referring now to FIG. 6, the reverse similarity matrix 600 between the pair of sentences 502 and 504 of FIG. 5 is depicted. Calculating the plurality of reverse similarity matrix 600 is similar to calculating the forward similarity matrix 500, though in a reverse order. The calculation of cosine similarity between the vectors of each reversed sentence pair (in which sentence 504 is now the first sentence analyzed, and sentence 502 is now the second sentence analyzed) is used to generate the reverse similarity matrix 600. The reverse similarity matrix 600 may be generated by use of the formula of EQUATION 2 below.

$$\text{Similarity}_{reverse}(D_j, D_i) = [\cosine(\text{vector}(D_i), \text{vector}(D_j))] \quad \text{(EQUATION 2)}$$

The reverse similarity matrix 600 is also the forward similarity matrix 500 transposed as set forth in EQUATION 3 below.

$$\text{Similarity}_{reverse}(D_i, D_j) = [\text{Similarity}_{Forward}(D_i, D_j)]^T \quad \text{(EQUATION 3)}$$

An output of EQUATION 3 is a Y by X matrix of reverse cosine similarity values 606 (calculated similar to how reverse similarity values 406 of FIG. 4 are calculated), where X is representative of the number of words in the sentence 502 analyzed as the second sentence and as is set forth as column 602, and Y is representative of the number of words in the sentence 504 analyzed as the first sentence and as is set forth in column 604.

Figure 7:
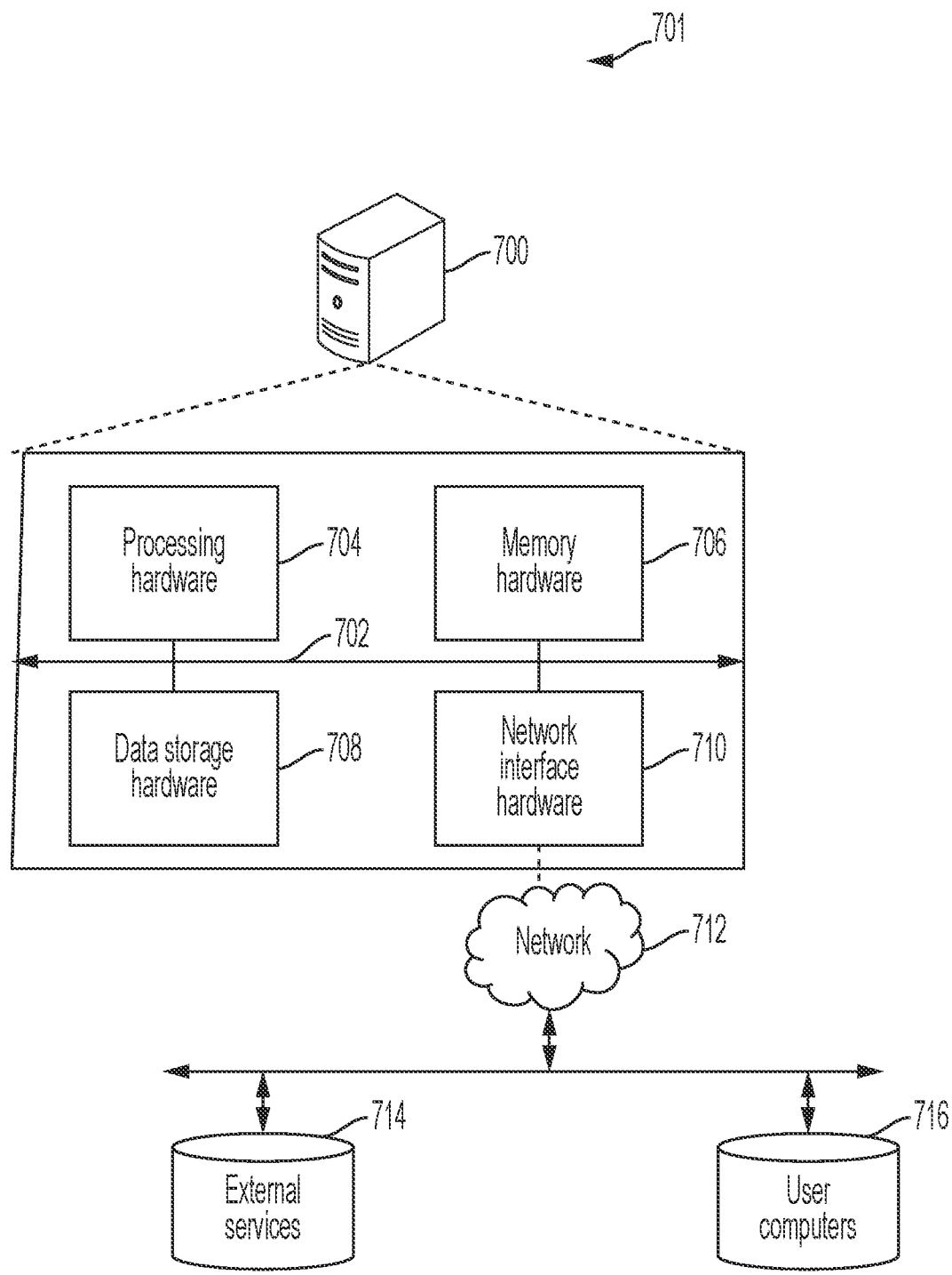
FIG. 7 illustrates a computer implemented system for short text similarity based clustering such as with the processes of FIGS. 1-2, according to one or more embodiments shown and described herein.

Referring now to FIG. 7, a schematic illustration of an example system 701 is depicted. The system 701 of FIG. 7 includes a server 700, a communication path 702, one or more processors 704, memory 706, data storage hardware 708, network interface hardware 710, a network 712, external services 714, and user computers 716. The server 700 may include hardware and software that may be used in carrying out the processes according to one or more embodiments shown. As illustrated, the server device 700 may be communicatively coupled via the communication path 702 with the one or more processors 704, non-transitory memory hardware as the memory 706, the data storage hardware 708, and the network interface hardware 710, which collectively may further be coupled via the network 712 to the external services 714 and the user computers 716. The communication path 702 communicatively connects the various components of the system 701. The network interface hardware 710 is configured to allow the server 700 to communicatively connect to the external services 714 and the user computers 716 via the network 712.

The one or more processors 704 may be any device capable of executing machine readable and executable instructions to cause the system 701 to implement one or more processes as described herein. Accordingly, each of the one or more processors of the one or more processors 704 may be a controller, an integrated circuit, a microchip, or any other computing device. The one or more processors 704 is coupled to the communication path 702 that provides signal connectivity between the various components of the server device 700. Accordingly, the communication path 702 may communicatively couple any number of processors of the one or more processors 704 with one another and allow them to operate in a distributed computing environment. Each processor may operate as a node that may send and/or receive data. As used herein, the phrase "communicatively coupled" means that coupled components are capable of exchanging data signals with one another such as, e.g., electrical signals via a conductive medium, electromagnetic signals via air, optical signals via optical waveguides, and the like.

Accordingly, the communication path 702 may be formed from any medium that is capable of transmitting a signal such as, e.g., conductive wires, conductive traces, optical waveguides, and the like. In some embodiments, the communication path 702 may facilitate the transmission of wireless signals, such as Wi-Fi, Bluetooth, Near-Field Communication (NFC), and the like. Moreover, the communication path 702 may be formed from a combination of mediums capable of transmitting signals. In one embodiment, the communication path 702 includes a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory 706 is communicatively coupled to the communication path 702 and may contain one or more memory modules comprising RAM, ROM, flash memories, hard drives, or any device capable of storing machine readable and executable instructions such that the machine readable and executable instructions can be accessed by the one or more processors 704. The machine readable and executable instructions may include logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine readable and executable instructions and stored on the memory 706. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The data storage hardware 708 is communicatively coupled to the communication path 702 and may contain one or more persistent storage devices such as solid state drives, hard disk drives, or any other device capable of persistent data storage. The data storage hardware 708 may store data used by various components of the server device 700 and the system 701 such as a database of electronic document files. In addition, the data storage hardware 708 may store data gathered from an external service 714 and/or received from user computers 716. It should be understood that the data storage hardware 708 may reside local to and/or remote from the server device 700, and may be configured to store one or more pieces of data for access by the server device 700 and/or other components. The data storage hardware 708 may include electronic documents on which searches are performed. The data storage hardware 708 may also include indexes of the electronic documents and their corresponding metadata. Other data to perform the functionalities described herein may also be stored in the data storage hardware 708 (e.g., cached data, user session data, search session data, etc.).

The network interface component 710 can be any device capable of transmitting and/or receiving data via a network or other communication mechanisms. Accordingly, the network interface hardware 710 can include a communication transceiver for sending and/or receiving any wired or wireless communication. For example, the network interface hardware 710 may include an antenna, a modem, a LAN port, a Wi-Fi card, a WiMAX card, a cellular modem, near-field communication hardware, satellite communication hardware, and/or any other wired or wireless hardware for communicating with other networks and/or devices.

The network interface hardware 710 communicatively connects the server device 700 to external systems, such as external services 714 and user computers 716, via a network 712. The network 712 may be a wide area network, a local area network, a personal area network, a cellular network, a satellite network, and the like.

External services 714 include services that operate beyond the server 700 such as external data storage services, external processing services, external user authentication services, etc. User computers 716 include computers such as laptop computers, desktop computers, smartphones, tablets, etc. from which a user of the system 701 may be requesting clustering.

It should be understood that the components illustrated in FIG. 7 are merely illustrative and are not intended to limit the scope of this disclosure. More specifically, while the components in FIG. 7 are illustrated as residing within the server 700, this is a non-limiting example. In some embodiments, one or more of the components may reside external to the server 700. In some embodiments, the server computing device 700 may exist as a virtual machine operating within a host machine alongside other virtual machines, each of which share the same computing resources belonging to the host machine.

Example 1

Figure 8B:
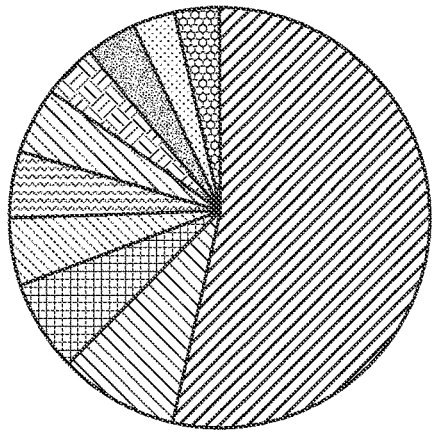
FIG. 8B illustrates a graphical representation of the results of FIG. 8A.

Referring now to FIGS. 8A-8B, results (FIG. 8A) of an implementation and an associated graphical representation (FIG. 8B) of an EXAMPLE 1 for clustering short text with a non-short text clustering method 800 is shown. The analyzed data of Example 1 includes 4386 documents grouped into 25 clusters as seen in table 802. The documents were short text reviews. The cluster analysis used in the non-short text clustering method 800 of EXAMPLE 1 is K-means clustering with TF-IDF vectorization.

As seen in a graph 804 in FIG. 8B of the distribution of reviews, one cluster includes more than half of the documents in the top 10 largest clusters. As seen in table 802 of FIG. 1, that same cluster includes approximately 44% of documents with the remaining 24 clusters having approximately 8% or fewer.

Example 2

Figure 9:
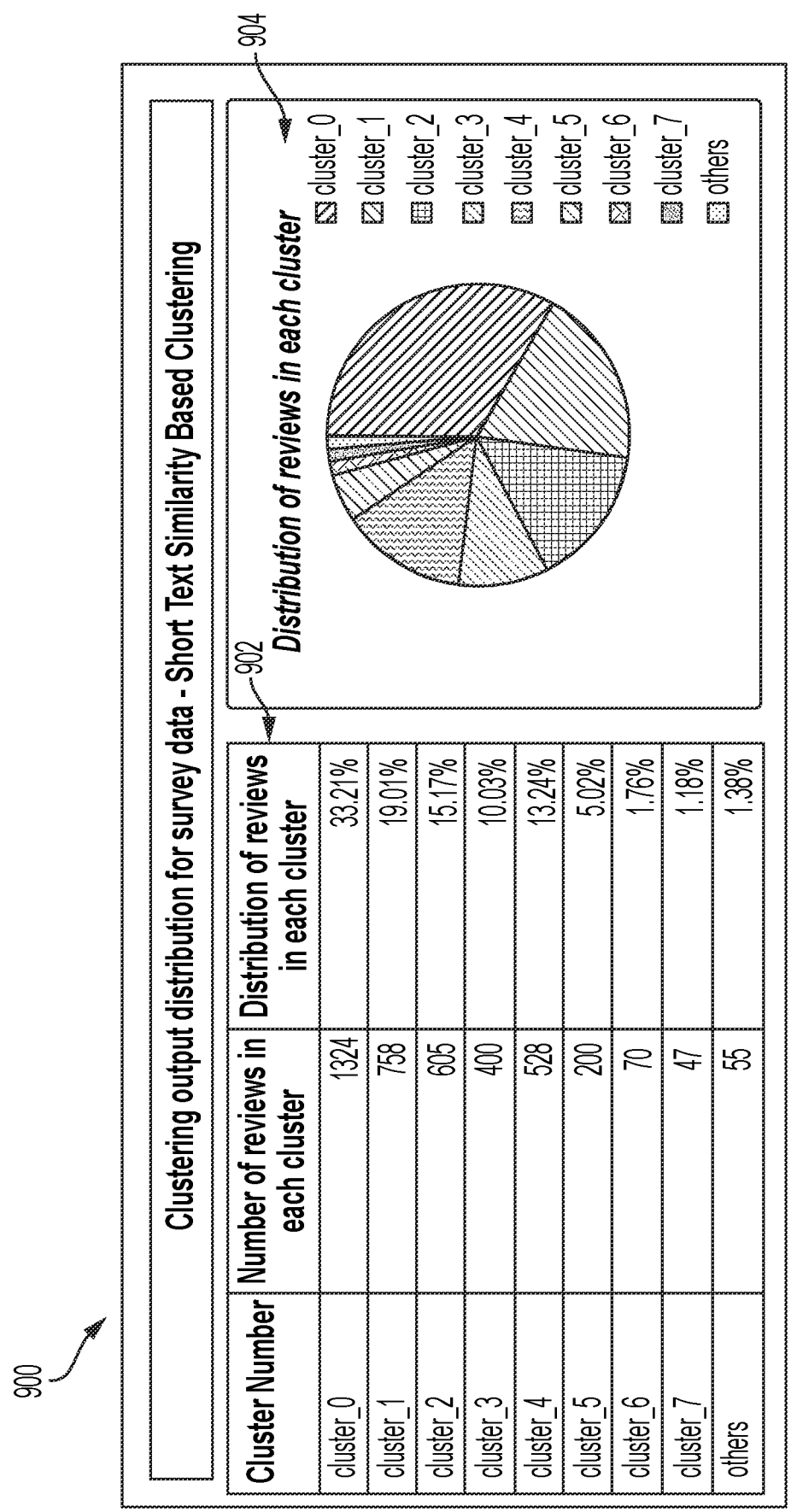
FIG. 9 illustrates results of an implementation and an associated graphical representation for clustering short text with a short text similarity based clustering method, according to one or more embodiments shown and described herein.

Referring now to FIG. 9, results of an implementation and an associated graphical representation of an EXAMPLE 2 for clustering short text with an embodiment of a short text similarity based clustering method 900 is shown. The analyzed data includes 3987 documents as short text review grouped into more than 8 clusters as seen in table 902. A cluster analysis as described herein with respect to FIGS. 1-7 analyzed the data via the short text similarity based clustering method 900.

As seen in a graph 904 of FIG. 9 representative of the distribution of reviews, the top cluster contains nearly one-third of the documents. As seen in table 902, the next four largest clusters contain between 10 and 20 percent of the documents, while the remainder contain approximately 5% or fewer documents. In comparison to the method 800, method 900 more evenly distributes short text documents among clusters. Of the top 5 clusters of method 800, only 1 had more than 10% of the total number of documents. By contrast, of the top 5 clusters of method 900, all of them had more than 10% of the total number of documents.

Referring to at least FIGS. 1-4 and 7, the system 701 may be a short text similarity based clustering system 701 including one or more processors 704, one or more memory components 706 communicatively coupled to the one or more processors 704, and machine-readable instructions stored in the one or more memory components 706. The machine-readable instructions may cause the short text similarity based clustering system 701 when executed by the one or more processors 704 to implement one or more blocks of the methods, processes, or control schemes as described herein, such as processes 100, 200 of FIGS. 1-2 and method 900 of FIG. 9. The systems and methods described herein may be applied to documents including short text or other data.

In aspects, and referring to FIGS. 2-4, the machine readable instructions cause the short text similarity based clustering system 701 of FIG. 7 to perform at least the following when executed by the one or more processors 704: (i) receive a plurality of documents D (e.g., of the document set 300D of FIG. 2 or such as documents 302-314 of the document set 300 of FIG. 3) including short text data, (ii) determine a plurality of forward similarity values 404 (as shown in FIG. 4) based on the short text data in each of the plurality of documents D, (iii) determine a plurality of reverse similarity values 406 (as shown in FIG. 4) based on the short text data in each of the plurality of documents D, (iv) generate a forward and reverse similarity matrix 400 (FIG. 4) based on the plurality of forward similarity values 404 and the plurality of reverse similarity values 406, and generate a plurality of short text similarity based clusters C (as shown in block 218 of FIG. 2) to group the short text data of the plurality of documents D based on the forward and reverse similarity matrix 400. A forward similarity value 400 of one indicates a subsequent document D2 (FIG. 2) includes at least the short text data of a preceding document D1, and a reverse similarity value 406 of one indicates the preceding document D1 includes at least the short text data of the subsequent document D2. Referring to FIGS. 2 and 4, a cluster range may be determined for each cluster C, a difference may be determined between the plurality of forward similarity values 404 and the plurality of reverse similarity values 406 for each pair of documents of the plurality of documents D within the forward and reverse similarity matrix 400, and each pair of documents having the difference within the cluster range may be placed in the respective cluster C.

In embodiments, a maximum similarity score may be determined in each row of the forward and reverse similarity matrix 400 for a reference document of the plurality of documents D (such as the documents 302-314 of the document set 300 of FIG. 3 or the first and second sentence 502, 504 documents of FIGS. 5-6), a threshold calculated such that the threshold is within a range of the maximum similarity score, the forward and reverse similarity matrix 400 compressed based on the threshold to generate a compressed forward and reverse similarity matrix 400C including the plurality of documents D having values within the range of the maximum similarity score, and the plurality of short text similarity based clusters generated based on the compressed forward and reverse similarity matrix 400. A link may be analyzed between the plurality of forward similarity values 404 and the plurality of reverse similarity values 406 of the plurality of documents D compared to the reference document based on the compressed forward and reverse similarity matrix 400. The iterative process may be repeated to generate the plurality of short text similarity based clusters until each document of the plurality of documents D has been used as the reference document to analyze each link.

A minimum similarity score may be determined in each row of the forward and reverse similarity matrix for the reference document of the plurality of documents D, the threshold calculated based on a ratio between the maximum similarity score and the minimum similarity score, and data points of the forward and reverse similarity matrix below the minimum similarity score removed. Data points of the forward and reverse similarity matrix 400 above the maximum similarity score may be masked.

As described herein, the short text data of each of the plurality of documents D may be preprocessed to generate a preprocessing prior to determine the plurality of forward similarity values 404 and the plurality of reverse similarity values 406 based on a natural language processing (NLP) tool (e.g., NLP tool T of FIG. 2 in block 206). The NLP tool T may include a library including a dictionary, one or more natural language rules, or combinations thereof, and the NLP tool T may be configured to use the library to extract text information from the short text data based on identification of domain independent and dependent terms, identify and tag one or more multi-word expressions with respect to the short text data, identify a relationship within the short text data between one or more entities and respective predicates, or combinations thereof. After use of the NLP tool T, the preprocessing further may include application of a statistical information extraction on the short text data of the plurality of documents D based on term frequency, entity frequency, co-occurrence terms frequency, distributional frequency of entities over short text data, distributional frequency of entities with predicates and with other terms, or combinations thereof.

A word embedding tool based on a pre-trained model, a domain specific model, or combinations thereof to determine one or more word vectors associated with each of the plurality of documents may be used, as set forth in block 212 of FIG. 2. To determine the plurality of forward similarity values 404 and the plurality of reverse similarity values 406 between a pair of documents D1, D2 of the plurality of documents D, a cosine similarity may be applied to the one or more word vectors to determine the forward similarity value 404 or the reverse similarity value 406 therebetween, wherein the subsequent document D2 compared to the preceding document D1 is indicative of the forward similarity value, and the preceding document D1 compared to the subsequent document D2 is indicative of the reverse similarity value.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Aspects Listing:

Aspect 1. A short text similarity based clustering system includes one or more processors, one or more memory components communicatively coupled to the one or more processors, and machine-readable instructions stored in the one or more memory components. The machine-readable instructions cause the short text similarity based clustering system to receive a plurality of documents comprising short text data and determine a plurality of forward similarity values based on the short text data in each of the plurality of documents, wherein a forward similarity value of one indicates a subsequent document comprises at least the short text data of a preceding document. The machine-readable instructions also cause the short text similarity based clustering system to determine a plurality of reverse similarity values based on the short text data in each of the plurality of documents, wherein a reverse similarity value of one indicates the preceding document comprises at least the short text data of the subsequent document. The machine-readable instructions further cause the short text similarity based clustering system to generate a forward and reverse similarity matrix based on the plurality of forward similarity values and the plurality of reverse similarity values and generate a plurality of short text similarity based clusters to group the short text data of the plurality of documents based on the forward and reverse similarity matrix.

Aspect 2. The short text similarity based clustering system of Aspect 1, wherein the short text data comprises less than or equal to 256 alphanumeric characters.

Aspect 3. The short text similarity based clustering system of Aspect 1 or Aspect 2, wherein the machine-readable instructions when executed by the one or more processors further cause the short text similarity based clustering system to determine a cluster range for each cluster, determine a difference between the plurality of forward similarity values and the plurality of reverse similarity values for each pair of documents within the forward and reverse similarity matrix, and place each pair of documents having the difference within the cluster range in the respective cluster.

Aspect 4. The short text similarity based clustering system of any one of Aspect 1 to Aspect 3, wherein the machine-readable instructions when executed by the one or more processors further cause the short text similarity based clustering system to implement an iterative process, the iterative process causing the short text similarity based clustering system to, at least, determine a maximum similarity score in each row of the forward and reverse similarity matrix for a reference document of the plurality of documents, calculate a threshold such that the threshold is within a range of the maximum similarity score, compress the forward and reverse similarity matrix based on the threshold to generate a compressed forward and reverse similarity matrix including the plurality of documents having values within the range of the maximum similarity score, and generate the plurality of short text similarity based clusters based on the compressed forward and reverse similarity matrix.

Aspect 5. The short text similarity based clustering system of Aspect 4, wherein the machine-readable instructions when executed by the one or more processors further cause the short text similarity based clustering system to analyze a link between the plurality of forward similarity values and the plurality of reverse similarity values of the plurality of documents compared to the reference document based on the compressed forward and reverse similarity matrix, and repeat the iterative process to generate the plurality of short text similarity based clusters until each document has been used as the reference document to analyze each link.

Aspect 6. The short text similarity based clustering system of Aspect 4 or Aspect 5, wherein machine-readable instructions to compress the forward and reverse similarity matrix further comprises machine-readable instructions to determine a minimum similarity score in each row of the forward and reverse similarity matrix for the reference document of the plurality of documents, calculate the threshold based on a ratio between the maximum similarity score and the minimum similarity score, and remove data points of the forward and reverse similarity matrix below the minimum similarity score.

Aspect 7. The short text similarity based clustering system of any of Aspect 4 to Aspect 6, wherein machine-readable instructions to compress the forward and reverse similarity matrix further comprises machine-readable instructions to mask data points of the forward and reverse similarity matrix above the maximum similarity score.

Aspect 8. The short text similarity based clustering system of any of Aspect 1 to Aspect 7, wherein the machine-readable instructions when executed by the one or more processors further cause the short text similarity based clustering system to preprocess the short text data of each of the plurality of documents to generate a preprocessing prior to determine the plurality of forward similarity values and the plurality of reverse similarity values based on a natural language processing (NLP) tool.

Aspect 9. The short text similarity based clustering system of Aspect 8, wherein the NLP tool comprises a library including a dictionary, one or more natural language rules, or combinations thereof, and the NLP tool is configured to use the library to extract text information from the short text data based on identification of domain independent and dependent terms, identify and tag one or more multi-word expressions with respect to the short text data, identify a relationship within the short text data between one or more entities and respective predicates, or combinations thereof.

Aspect 10. The short text similarity based clustering system of Aspect 8 or Aspect 9, wherein, after use of the NLP tool, the preprocessing further comprises application of a statistical information extraction on the short text data of the plurality of documents based on term frequency, entity frequency, co-occurrence terms frequency, distributional frequency of entities over short text data, distributional frequency of entities with predicates and with other terms, or combinations thereof.

Aspect 11. The short text similarity based clustering system of any of Aspect 1 to Aspect 10, wherein the machine-readable instructions when executed by the one or more processors further cause the short text similarity based clustering system to use a word embedding tool based on a pre-trained model, a domain specific model, or combinations thereof to determine one or more word vectors associated with each of the plurality of documents.

Aspect 12. The short text similarity based clustering system of Aspect 11, wherein, to determine the plurality of forward similarity values and the plurality of reverse similarity values between a pair of documents of the plurality of documents, the machine-readable instructions when executed by the one or more processors further cause the short text similarity based clustering system to apply a cosine similarity to the one or more word vectors to determine the forward similarity value or the reverse similarity value therebetween, wherein the subsequent document compared to the preceding document is indicative of the forward similarity value, and the preceding document compared to the subsequent document is indicative of the reverse similarity value.

Aspect 13. A short text similarity based clustering system includes one or more processors, one or more memory components communicatively coupled to the one or more processors, and machine-readable instructions stored in the one or more memory components. The machine-readable instructions cause the short text similarity based clustering system to receive a plurality of documents comprising short text data and preprocess the short text data of each of the plurality of documents to generate a preprocessing based on a natural language processing (NLP) tool comprising a library, the NLP tool configured to use the library to extract text information from the short text data. After the preprocessing, the machine-readable instructions cause the short text similarity based clustering system to determine a plurality of forward similarity values based on the short text data in each of the plurality of documents, wherein a forward similarity of one indicates a subsequent document comprises at least the short text data of a preceding document. The machine-readable instructions also cause the short text similarity based clustering system to determine a plurality of reverse similarity values based on the short text data in each of the plurality of documents, wherein a reverse similarity of one indicates the preceding document comprises at least the short text data of the subsequent document. The machine-readable instructions further cause the short text similarity based clustering system to generate a forward and reverse similarity matrix based on the plurality of forward similarity values and the plurality of reverse similarity values, and generate a plurality of short text similarity based clusters to group the short text data of the plurality of documents based on the forward and reverse similarity matrix.

Aspect 14. The short text similarity based clustering system of Aspect 13, wherein the machine-readable instructions when executed by the one or more processors further cause the short text similarity based clustering system to determine a cluster range for each cluster, determine a difference between the plurality of forward similarity values and the plurality of reverse similarity values for each pair of documents within the forward and reverse similarity matrix, and place each pair of documents having the difference within the cluster range in the respective cluster.

Aspect 15. The short text similarity based clustering system of Aspect 13 or Aspect 14, wherein the machine-readable instructions when executed by the one or more processors further cause the short text similarity based clustering system to implement an iterative process, to the iterative process causing short text similarity based clustering system to, at least, determine a maximum similarity score in each row of the forward and reverse similarity matrix for a reference document of the plurality of documents, determine a minimum similarity score in each row of the forward and reverse similarity matrix for the reference document of the plurality of documents, calculate a threshold based on a ratio between the maximum similarity score and the minimum similarity score such that the threshold is within a range of the maximum similarity score, compress the forward and reverse similarity matrix based on the threshold to generate a compressed forward and reverse similarity matrix including the plurality of documents having values within the range of the maximum similarity score, and generate the plurality of short text similarity based clusters based on the compressed forward and reverse similarity matrix.

Aspect 16. The short text similarity based clustering system of any of Aspect 13 to Aspect 15, wherein the library comprises a dictionary, one or more natural language rules, or combinations thereof, and the NLP tool is configured to use the library to extract text information from the short text data based on identification of domain independent and dependent terms, identify and tag one or more multi-word expressions with respect to the short text data, identify a relationship within the short text data between one or more entities and respective predicates, or combinations thereof.

Aspect 17. The short text similarity based clustering system of any of Aspect 13 to Aspect 16, wherein, after use of the NLP tool, the preprocessing further comprises application of a statistical information extraction on the short text data of the plurality of documents based on term frequency, entity frequency, co-occurrence terms frequency, distributional frequency of entities over short text data, distributional frequency of entities with predicates and with other terms, or combinations thereof.

Aspect 18. A short text similarity based clustering method includes receiving a plurality of documents comprising short text data and determining a plurality of forward similarity values based on the short text data in each of the plurality of documents, wherein a forward similarity of one indicates a subsequent document comprises at least the short text data of a preceding document. The method also includes determining a plurality of reverse similarity values based on the short text data in each of the plurality of documents, wherein a reverse similarity of one indicates the preceding document comprises at least the short text data of the subsequent document. The method further includes generating a forward and reverse similarity matrix based on the plurality of forward similarity values and the plurality of reverse similarity values and generating a plurality of short text similarity based clusters to group the short text data of the plurality of documents based on the forward and reverse similarity matrix.

Aspect 19. The method of Aspect 18, further including determining a cluster range for each cluster, determining a difference between the plurality of forward similarity values and the plurality of reverse similarity values for each pair of documents within the forward and reverse similarity matrix, and placing each pair of documents having the difference within the cluster range in the respective cluster.

Aspect 20. The method of Aspect 18 or Aspect 19, further including implementing an iterative process. The iterative process includes determining a maximum similarity score in each row of the forward and reverse similarity matrix for a reference document of the plurality of documents, determining a minimum similarity score in each row of the forward and reverse similarity matrix for the reference document of the plurality of documents, calculating a threshold based on a ratio between the maximum similarity score and the minimum similarity score such that the threshold is within a range of the maximum similarity score, compressing the forward and reverse similarity matrix based on the threshold to generate a compressed forward and reverse similarity matrix including the plurality of documents having values within the range of the maximum similarity score, and generating the plurality of short text similarity based clusters based on the compressed forward and reverse similarity matrix.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A short text similarity based clustering system comprising:
   one or more processors;
   one or more memory components communicatively coupled to the one or more processors; and
   machine-readable instructions stored in the one or more memory components that cause the short text similarity based clustering system to perform at least the following when executed by the one or more processors:
   receive a plurality of documents comprising short text data;
   determine a plurality of forward similarity values based on the short text data in each of the plurality of documents, wherein a forward similarity value of one indicates a subsequent document comprises at least the short text data of a preceding document;
   determine a plurality of reverse similarity values based on the short text data in each of the plurality of documents, wherein a reverse similarity value of one indicates the preceding document comprises at least the short text data of the subsequent document;
   generate a forward and reverse similarity matrix based on the plurality of forward similarity values and the plurality of reverse similarity values; and
   generate a plurality of short text similarity based clusters to group the short text data of the plurality of documents based on the forward and reverse similarity matrix.

2. The short text similarity based clustering system of claim 1, wherein the short text data comprises less than or equal to 256 alphanumeric characters.

3. The short text similarity based clustering system of claim 1, wherein the machine-readable instructions when executed by the one or more processors further cause the short text similarity based clustering system to:
   determine a cluster range for each cluster;
   determine a difference between the plurality of forward similarity values and the plurality of reverse similarity values for each pair of documents within the forward and reverse similarity matrix; and
   place each pair of documents having the difference within the cluster range in the respective cluster.

4. The short text similarity based clustering system of claim 1, wherein the machine-readable instructions when executed by the one or more processors further cause the short text similarity based clustering system to implement an iterative process, the iterative process causing the short text similarity based clustering system to perform at least the following:
   determine a maximum similarity score in each row of the forward and reverse similarity matrix for a reference document of the plurality of documents;
   calculate a threshold such that the threshold is within a range of the maximum similarity score;
   compress the forward and reverse similarity matrix based on the threshold to generate a compressed forward and reverse similarity matrix including the plurality of documents having values within the range of the maximum similarity score; and generate the plurality of short text similarity based clusters based on the compressed forward and reverse similarity matrix.

5. The short text similarity based clustering system of claim 4, wherein the machine-readable instructions when executed by the one or more processors further cause the short text similarity based clustering system to:
analyze a link between the plurality of forward similarity values and the plurality of reverse similarity values of the plurality of documents compared to the reference document based on the compressed forward and reverse similarity matrix; and
repeat the iterative process to generate the plurality of short text similarity based clusters until each document has been used as the reference document to analyze each link.

6. The short text similarity based clustering system of claim 4, wherein machine-readable instructions to compress the forward and reverse similarity matrix further comprises machine-readable instructions to:
determine a minimum similarity score in each row of the forward and reverse similarity matrix for the reference document of the plurality of documents;
calculate the threshold based on a ratio between the maximum similarity score and the minimum similarity score; and
remove data points of the forward and reverse similarity matrix below the minimum similarity score.

7. The short text similarity based clustering system of claim 4, wherein machine-readable instructions to compress the forward and reverse similarity matrix further comprises machine-readable instructions to:
mask data points of the forward and reverse similarity matrix above the maximum similarity score.

8. The short text similarity based clustering system of claim 1, wherein the machine-readable instructions when executed by the one or more processors further cause the short text similarity based clustering system to:
preprocess the short text data of each of the plurality of documents to generate a preprocessing prior to determine the plurality of forward similarity values and the plurality of reverse similarity values based on a natural language processing (NLP) tool.

9. The short text similarity based clustering system of claim 8, wherein the NLP tool comprises a library including a dictionary, one or more natural language rules, or combinations thereof, and the NLP tool is configured to use the library to extract text information from the short text data based on identification of domain independent and dependent terms, identify and tag one or more multi-word expressions with respect to the short text data, identify a relationship within the short text data between one or more entities and respective predicates, or combinations thereof.

10. The short text similarity based clustering system of claim 8, wherein, after use of the NLP tool, the preprocessing further comprises application of a statistical information extraction on the short text data of the plurality of documents based on term frequency, entity frequency, co-occurrence terms frequency, distributional frequency of entities over short text data, distributional frequency of entities with predicates and with other terms, or combinations thereof.

11. The short text similarity based clustering system of claim 1, wherein the machine-readable instructions when executed by the one or more processors further cause the short text similarity based clustering system to:
use a word embedding tool based on a pre-trained model, a domain specific model, or combinations thereof to determine one or more word vectors associated with each of the plurality of documents.

12. The short text similarity based clustering system of claim 11, wherein, to determine the plurality of forward similarity values and the plurality of reverse similarity values between a pair of documents of the plurality of documents, the machine-readable instructions when executed by the one or more processors further cause the short text similarity based clustering system to:
apply a cosine similarity to the one or more word vectors to determine the forward similarity value or the reverse similarity value therebetween, wherein the subsequent document compared to the preceding document is indicative of the forward similarity value, and the preceding document compared to the subsequent document is indicative of the reverse similarity value.

13. A short text similarity based clustering system comprising:
one or more processors;
one or more memory components communicatively coupled to the one or more processors; and
machine-readable instructions stored in the one or more memory components that cause the short text similarity based clustering system to perform at least the following when executed by the one or more processors:
receive a plurality of documents comprising short text data;
preprocess the short text data of each of the plurality of documents to generate a preprocessing based on a natural language processing (NLP) tool comprising a library, the NLP tool configured to use the library to extract text information from the short text data;
after the preprocessing, determine a plurality of forward similarity values based on the short text data in each of the plurality of documents, wherein a forward similarity of one indicates a subsequent document comprises at least the short text data of a preceding document;
determine a plurality of reverse similarity values based on the short text data in each of the plurality of documents, wherein a reverse similarity of one indicates the preceding document comprises at least the short text data of the subsequent document;
generate a forward and reverse similarity matrix based on the plurality of forward similarity values and the plurality of reverse similarity values; and
generate a plurality of short text similarity based clusters to group the short text data of the plurality of documents based on the forward and reverse similarity matrix.

14. The short text similarity based clustering system of claim 13, wherein the machine-readable instructions when executed by the one or more processors further cause the short text similarity based clustering system to:
determine a cluster range for each cluster;
determine a difference between the plurality of forward similarity values and the plurality of reverse similarity values for each pair of documents within the forward and reverse similarity matrix; and
place each pair of documents having the difference within the cluster range in the respective cluster.

15. The short text similarity based clustering system of claim 13, wherein the machine-readable instructions when executed by the one or more processors further cause the short text similarity based clustering system to implement an iterative process, to the iterative process causing short text similarity based clustering system to perform at least the following:

determine a maximum similarity score in each row of the forward and reverse similarity matrix for a reference document of the plurality of documents;

determine a minimum similarity score in each row of the forward and reverse similarity matrix for the reference document of the plurality of documents;

calculate a threshold based on a ratio between the maximum similarity score and the minimum similarity score such that the threshold is within a range of the maximum similarity score;

compress the forward and reverse similarity matrix based on the threshold to generate a compressed forward and reverse similarity matrix including the plurality of documents having values within the range of the maximum similarity score; and generate the plurality of short text similarity based clusters based on the compressed forward and reverse similarity matrix.

16. The short text similarity based clustering system of claim 13, wherein the library comprises a dictionary, one or more natural language rules, or combinations thereof, and the NLP tool is configured to use the library to extract text information from the short text data based on identification of domain independent and dependent terms, identify and tag one or more multi-word expressions with respect to the short text data, identify a relationship within the short text data between one or more entities and respective predicates, or combinations thereof.

17. The short text similarity based clustering system of claim 13, wherein, after use of the NLP tool, the preprocessing further comprises application of a statistical information extraction on the short text data of the plurality of documents based on term frequency, entity frequency, co-occurrence terms frequency, distributional frequency of entities over short text data, distributional frequency of entities with predicates and with other terms, or combinations thereof.

18. A short text similarity based clustering method comprising:

receiving a plurality of documents comprising short text data;

determining a plurality of forward similarity values based on the short text data in each of the plurality of documents, wherein a forward similarity of one indicates a subsequent document comprises at least the short text data of a preceding document;

determining a plurality of reverse similarity values based on the short text data in each of the plurality of documents, wherein a reverse similarity of one indicates the preceding document comprises at least the short text data of the subsequent document;

generating a forward and reverse similarity matrix based on the plurality of forward similarity values and the plurality of reverse similarity values; and generating a plurality of short text similarity based clusters to group the short text data of the plurality of documents based on the forward and reverse similarity matrix.

19. The method of claim 18, further comprising:

determining a cluster range for each cluster;

determining a difference between the plurality of forward similarity values and the plurality of reverse similarity values for each pair of documents within the forward and reverse similarity matrix; and placing each pair of documents having the difference within the cluster range in the respective cluster.

20. The method of claim 18, further comprising implementing an iterative process, the iterative process comprising:

determining a maximum similarity score in each row of the forward and reverse similarity matrix for a reference document of the plurality of documents;

determining a minimum similarity score in each row of the forward and reverse similarity matrix for the reference document of the plurality of documents;

calculating a threshold based on a ratio between the maximum similarity score and the minimum similarity score such that the threshold is within a range of the maximum similarity score;

compressing the forward and reverse similarity matrix based on the threshold to generate a compressed forward and reverse similarity matrix including the plurality of documents having values within the range of the maximum similarity score; and generating the plurality of short text similarity based clusters based on the compressed forward and reverse similarity matrix.

* * * * *